United States Patent
Ma et al.

(10) Patent No.: US 11,025,476 B2
(45) Date of Patent: Jun. 1, 2021

(54) MULTI-CHANNEL CONTENTION METHOD, COMMUNICATIONS DEVICE, AND WIRELESS NETWORK SYSTEM

(71) Applicant: Huawei Technologies Co., Ltd., Shenzhen (CN)

(72) Inventors: Chixiang Ma, Shanghai (CN); Jun Luo, Shanghai (CN); Yalin Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/350,334

(22) Filed: Nov. 14, 2016

(65) Prior Publication Data
US 2017/0063594 A1    Mar. 2, 2017

Related U.S. Application Data

(63) Continuation of application No. PCT/CN2014/077387, filed on May 13, 2014.

(51) Int. Cl.
*H04W 72/04* (2009.01)
*H04L 29/06* (2006.01)
(Continued)

(52) U.S. Cl.
CPC .............. *H04L 29/06* (2013.01); *H04B 7/26* (2013.01); *H04W 74/08* (2013.01); *H04W 74/0816* (2013.01); *H04W 84/12* (2013.01)

(58) Field of Classification Search
None
See application file for complete search history.

(56) References Cited

U.S. PATENT DOCUMENTS

| 8,320,397 B2 | 11/2012 | Desai et al. |
| 9,031,054 B2 * | 5/2015 | Marin ................. H04W 74/006 370/348 |

(Continued)

FOREIGN PATENT DOCUMENTS

| CN | 101150500 A | 3/2008 |
| CN | 101729132 A | 6/2010 |

(Continued)

OTHER PUBLICATIONS

Machine Translation and Abstract of Chinese Publication No. CN101729132, Jun. 9, 2010, 3 pages.

(Continued)

*Primary Examiner* — Willie J Daniel, Jr.
(74) *Attorney, Agent, or Firm* — Conley Rose, P.C.

(57) ABSTRACT

A multi-channel contention method, a communications device, and a wireless network system are presented. The present disclosure is applied to a communications device in a wireless network, where the communications device is an access point or a station; and the communications device includes: a channel contention module configured to: listen to at least two channels, determine a first channel succeeding in contention, and determine a second channel considered to succeed in contention; and an exchange module configured to: exchange a control frame with another communications device in the wireless network using the first channel and the second channel in order to occupy the channels, or exchange a data frame.

20 Claims, 12 Drawing Sheets

(51) Int. Cl.
*H04B 7/26* (2006.01)
*H04W 74/08* (2009.01)
*H04W 84/12* (2009.01)

(56) References Cited

U.S. PATENT DOCUMENTS

| | | | |
|---|---|---|---|
| 2011/0317674 | A1 | 12/2011 | Park et al. |
| 2012/0008599 | A1 | 1/2012 | Marin et al. |
| 2012/0082040 | A1 | 4/2012 | Gong et al. |
| 2014/0079016 | A1 | 3/2014 | Dai et al. |
| 2014/0092860 | A1* | 4/2014 | Kneckt ............. H04W 72/1205 370/329 |
| 2015/0131624 | A1* | 5/2015 | Merlin ................ H04W 52/243 370/336 |

FOREIGN PATENT DOCUMENTS

| | | |
|---|---|---|
| CN | 102238749 A | 11/2011 |
| CN | 102665243 A | 9/2012 |
| CN | 103250459 A | 8/2013 |
| CN | 103416017 A | 11/2013 |
| WO | 2012172157 A1 | 12/2012 |

OTHER PUBLICATIONS

"Part 11: Wireless LAN Medium Access Control (MAC) and Physical Layer (PHY) Specifications," IEE Std 802.11, Mar. 29, 2012, 2793 pages.
"Part 11: Wireless LAN Medium Access Control (MAC) and Physical Layer (PHY) Specifications, Amendment 4: Enhancements for Very High Throughput for Operation in Bands below 6 GHz," IEEE Std 802.11ac, Dec. 11, 2013, 425 pages.
"Part 11: Wireless LAN Medium Access Control (MAC) and Physical Layer (PHY) Specifications, Amendment 5: Enhancements for Higher Throughput," IEEE Std 802.11n, Oct. 29, 2009, 536 pages.
"Part 11: Wireless LAN Medium Access Control (MAC) and Physical Layer (PHY) specifications, Amendment 4: Further Higher Data Rate Extension in the 2.4 GHz Band," IEEE Std 802.11g, Jun. 12, 2003, 77 pages.
Park, M., "IEEE 802.11ac: Dynamic Bandwidth Channel Access," IEEE International Conference on Communications, Jun. 5-9, 2011, 6 pages.
"802.11ac: A Survival Guide," XP55354479, Dec. 28, 2013, 10 pages.
Foreign Communication From a Counterpart Application, European Application No. 14892064.8, Extended European Search Report dated Mar. 21, 2017, 10 pages.
Foreign Communication From a Counterpart Application, PCT Application No. PCT/CN2014/077387, English Translation of International Search Report dated Jan. 21, 2015, 2 pages.
Foreign Communication From a Counterpart Application, PCT Application No. PCT/CN2014/077387, English Translation of Written Opinion dated Jan. 21, 2015, 9 pages.
Machine Translation and Abstract of Chinese Publication No. CN101150500, Mar. 26, 2008, 27 pages.
Machine Translation and Abstract of Chinese Publication No. CN102238749, Nov. 9, 2011, 12 pages.
Foreign Communication From a Counterpart Application, Chinese Application No. 201480078722.7, Chinese Office Action dated Jan. 4, 2019, 10 pages.

* cited by examiner

MULTI-CHANNEL CONTENTION METHOD, COMMUNICATIONS DEVICE, AND WIRELESS NETWORK SYSTEM

CROSS-REFERENCE TO RELATED APPLICATIONS

This application is a continuation of International Application No. PCT/CN2014/077387, filed on May 13, 2014, the disclosure of which is hereby incorporated by reference in its entirety.

TECHNICAL FIELD

Embodiments of the present disclosure relate to the communications technologies, and in particular, to a multi-channel contention method, a communications device, and a wireless network system.

BACKGROUND

In an existing mechanism stipulated in the Institute of Electrical and Electronics Engineers (IEEE) 802.11 standard, channels are classified into a primary channel and a secondary channel to increase a transmission bandwidth to increase a peak rate of data transmission. This mechanism is similar to carrier aggregation (CA), and a communications device first needs to contend for access on a primary channel. A priority sequence of access contention on channels is a primary channel, a secondary 20 mega hertz (MHz) channel, a secondary 40 MHz channel, and a secondary 80 MHz channel. A communications device contends for a next channel only when a previous channel in the foregoing sequence is allowed to be accessed, and finally, channels allowed to be accessed are combined together to form a large bandwidth channel to transmit data.

Currently, to further improve a throughput of a wireless local area network (WLAN), a scheduling mode is introduced to the IEEE 802.11 standard, a high efficiency wireless local area network (HEW) system is established, and a basic service set (BSS) is used as a basic scheduling set. When a BSS needs to perform data transmission, use of the foregoing mechanism leads to a situation in which a channel of a low contention priority is abandoned due to a failure to contend for a channel of a high priority; as a result, not only a success rate of channel contention is low, but also massive bandwidth waste is caused.

SUMMARY

Embodiments of the present disclosure provide a multi-channel contention method, a communications device, and a wireless network system, so as to resolve a problem that a success rate of multi-channel contention is low and massive bandwidth waste is caused.

According to a first aspect, an embodiment of the present disclosure provides a communications device applied to a wireless network, where the communications device is an access point (AP) or a station (STA), and the communications device includes a channel contention module configured to listen to at least two channels, determine a first channel succeeding in contention, and determine a second channel considered to succeed in contention; and an exchange module configured to exchange a control frame with another communications device in the wireless network using the first channel and the second channel, to occupy the channels, or exchange a data frame.

According to a second aspect, an embodiment of the present disclosure provides a multi-channel contention method, including listening, by a communications device, to at least two channels; determining, by the communications device, a first channel succeeding in contention, and determining a second channel considered to succeed in contention; and exchanging, by the communications device, a control frame with another communications device in a wireless network using the first channel and the second channel, to occupy the channels, or exchanging a data frame.

According to a third aspect, an embodiment of the present disclosure provides a wireless network system, including at least two communications devices, where one communications device is the STA according to any one of the first aspect or a first implementation manner to a sixth implementation manner of the first aspect, and the other communications device is the AP according to any one of the first aspect, the first implementation manner to a fourth implementation manner, a seventh implementation manner, or an eighth implementation manner of the first aspect; and the STA and the AP are separately configured to listen to at least two channels, and exchange a control frame using a first channel succeeding in contention and a second channel considered to succeed in contention, to occupy the channels, or exchange a data frame.

According to the multi-channel contention method, the communications device, and the wireless network system in the embodiments of the present disclosure, a communications device in a BSS may not distinguish a primary-secondary relationship of channels and may not necessarily contend for channels in sequence according to priorities as in the prior art, but may synchronously determine a first channel and a second channel that succeed in contention, exchange information with another communications device using the first channel and the second channel, and perform centralized scheduling using an AP to achieve an objective that at least two communications devices in the BSS use multiple channels to transmit data, which not only improves a success rate of channel contention, but also prevents massive bandwidth waste.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
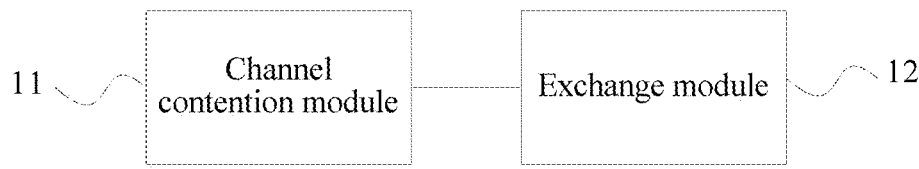
FIG. 1 is a schematic structural diagram of Embodiment 1 of a communications device applied to a wireless network according to the present disclosure.

FIG. 1 is a schematic structural diagram of Embodiment 1 of a communications device applied to a wireless network according to the present disclosure. As shown in FIG. 1, the communications device is an AP or any STA in a same BSS as the AP. The communications device in this embodiment may include a channel contention module 11 and an exchange module 12, where the channel contention module 11 is configured to listen to at least two channels, determine a first channel succeeding in contention, and determine a second channel considered to succeed in contention; and the exchange module 12 is configured to exchange a control frame with another communications device in the wireless network using the first channel and the second channel, to occupy the channels, or exchange a data frame.

The communications device in this embodiment is applicable to a wireless network to which a scheduling mode is introduced, for example, a HEWWLAN system; and the HEW WLAN system uses a BSS as a basic service set, the BSS includes an AP and at least two STAs, and the STAs are standard stations in a wireless network to which a scheduling mode is introduced. To improve a success rate of channel contention of the BSS, the AP and the STAs that belong to the same BSS can all participate in channel contention; regardless of whether the AP or any of the STAs succeeds in contention, multiple channels can be used to transmit data.

In this embodiment, a communications device in a BSS may not distinguish a primary-secondary relationship of channels and may not necessarily contend for channels in sequence according to priorities as in the prior art, but may synchronously determine a first channel succeeding in contention and a second channel considered to succeed in contention, and then exchange a control frame or a data frame with another communications device using the first channel and the second channel, to achieve an objective that at least two communications devices in the BSS use multiple channels to transmit data, which not only improves a success rate of channel contention, but also prevents massive bandwidth waste.

Figure 2:
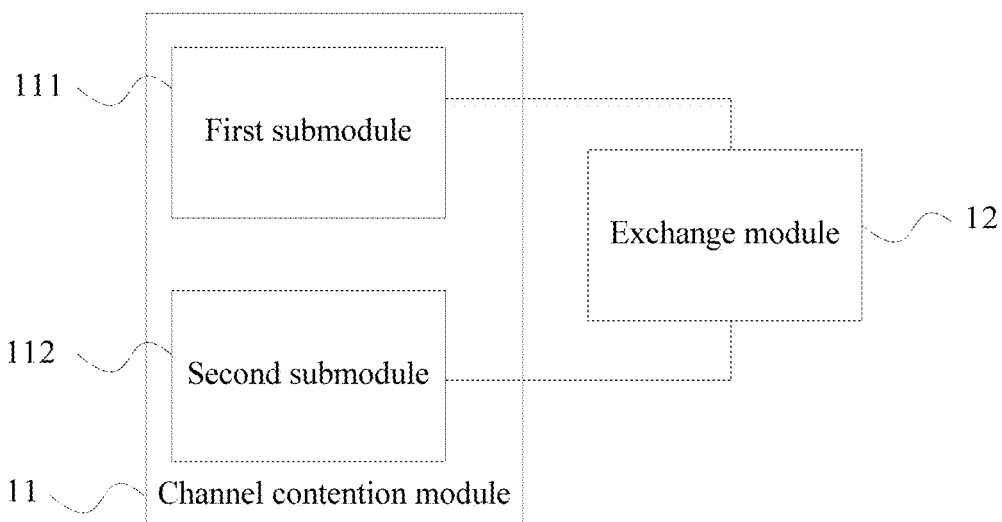
FIG. 2 is a schematic structural diagram of Embodiment 2 of a communications device applied to a wireless network according to the present disclosure.

FIG. 2 is a schematic structural diagram of Embodiment 2 of a communications device applied to a wireless network according to the present disclosure. As shown in FIG. 2, the communications device in this embodiment is based on the device structure shown in FIG. 1. Further, the channel contention module 11 may include a first sub-module 111 and a second sub-module 112, where the first sub-module 111 is configured to enter a waiting phase when it is obtained by means of listening that any channel of the at least two channels is in an idle state, and if the any channel is still in an idle state after the waiting phase, determine that the any channel enters a backoff timing phase; and determine a channel that is still in an idle state after a corresponding backoff timing phase ends as the first channel succeeding in contention, and determine another channel that is currently still in a corresponding backoff timing phase and that is in an idle state as the second channel considered to succeed in contention; and the second submodule 112 is configured to receive the control frame from the another communications device, and determine the channel that receives the control frame as the first channel succeeding in contention; and determine another channel that currently does not receive the control frame but that is in a corresponding backoff timing phase and that is in an idle state as the second channel considered to succeed in contention.

When listening to multiple channels and finding that any channel therein is in an idle state, the first submodule 111 enters the waiting phase; duration of the waiting phase may be an x interframe space (IFS), and the xIFS may be duration defined in a standard, such as a short interframe space (SIFS), a point coordination function interframe space (PIFS), a distributed coordination function interframe space (DIFS), or an arbitration interframe space (AIFS). After the first submodule 111 waits for the duration of the xIFS, if the any channel is still in an idle state, the any channel enters the backoff timing phase, where backoff timing may be a counter in which backoff duration is preset; when the any channel enters the backoff timing phase, the counter starts to count down, that timing ends is that the backoff timing phase ends. The first submodule 111 determines a channel that is still in an idle state after a corresponding backoff timing phase ends as the first channel succeeding in contention, that is, as long as a counter corresponding to any channel returns to zero and the channel is still in an idle state, it indicates that the channel succeeds in contention; it is not excluded that there are multiple channels that synchronously return to zero, and these channels are all first channels succeeding in contention, which is not limited in the present disclosure. In addition, the first submodule 111 determines other channels that are currently still in corresponding backoff timing phases and that are in an idle state, that is, determines whether other channels enter the backoff timing phases and are in an idle state, and if yes, all these channels that are in the backoff timing phases and that are in an idle state are all second channels considered to succeed in contention.

After receiving a control frame from the another communications device, the communications device as a receiver device may also contend for a channel; the second submodule 112 of the communications device determines a channel that receives the control frame as the first channel succeeding in contention, and determines another channel that currently does not receive the control frame but that is in a corresponding backoff timing phase and that is in an idle state as the second channel considered to succeed in contention; in this way, the communications device participating in channel contention not only can obtain by means of contention a channel using the first submodule 111 when used as a transmitter device but also can obtain by means of contention a channel using the second submodule 112 when used as a receiver device, thereby avoiding omission of an available channel.

Further, the foregoing control frame includes a frame control field used to identify the control frame and a duration field used to record duration of occupying a subsequent channel; the control frame may be high efficiency wireless local area network request to send HEW-RTS, high efficiency wireless local area network clear to send (HEW CTS), or high efficiency wireless local area network acknowledgement (HEW ACK).

Figure 3:
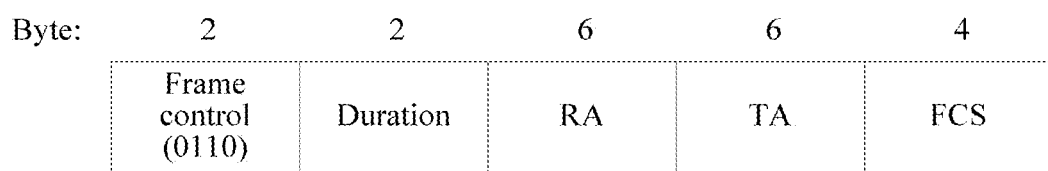
FIG. 3 is a schematic diagram 1 of a frame format of a control frame.

FIG. 3 is a schematic diagram 1 of a frame format of a control frame. As shown in FIG. 3, a control frame in this embodiment may be a frame dedicated to a wireless network system (for example, an HEW WLAN system) to which a scheduling mode is introduced, and has 20 bytes in total. A Frame Control field has two bytes, and a value of the field is a value not used yet by identification information of a control frame stipulated in the IEEE 802.11 standard and may be, for example, 0110. A STA in a BSS can distinguish according to the value that the control frame is a frame dedicated to the HEW WLAN system, and another conventional STA may also learn according to the value that the control frame is not sent to the another conventional STA and the another conventional STA cannot use a channel within a subsequent period of time. A duration field has two bytes, is set to duration of occupying a subsequent channel, and includes subsequent scheduling duration, m times of SIFS duration, and the sum of duration of n control frames, where m and n are natural numbers; specific values are related to an actual moment at which the control frame is sent; for example, the control frame is sent by a transmitter device, and then duration of occupying a subsequent channel includes scheduling duration, three times of SIFS duration, and the sum of duration of two control frames. A receiver address (RA) has six bytes, and may be set to, for example, a media access control (MAC) address of an AP, the same as an RA of the control frame stipulated in the IEEE 802.11 standard. A transmitter address (TA) has six bytes, and may be set to, for example, a MAC address of a STA, the same as a TA of the control frame stipulated in the IEEE 802.11 standard. Frame control sequence (FCS) information has four bytes, the same as an FCS of the control frame stipulated in the IEEE 802.11 standard. The format of the control frame in this embodiment may be the same as a format of the control frame stipulated in the IEEE 802.11 standard, so that all STAs, including STAs in a BSS and conventional STAs, can receive and demodulate the control frame. Each control frame occupies a bandwidth of 20 MHz, the bandwidth of 20 MHz has 64 subcarriers, a quantity and positions of pilot subcarriers are the same as those of control frames in the IEEE 802.11 standard. If there is a bandwidth of 80 MHz, a control frame is separately sent on each bandwidth of 20 MHz. The control frame differs from the control frame in the IEEE 802.11 standard in content of the Frame Control field and the duration field.

Figure 4:
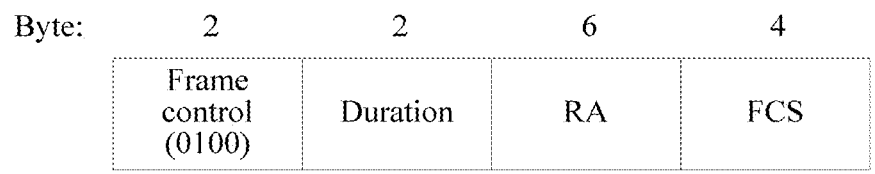
FIG. 4 is a schematic diagram 2 of a frame format of a control frame.

FIG. 4 is a schematic diagram 2 of a frame format of a control frame. As shown in FIG. 4, a control frame in this embodiment may be a frame dedicated to a wireless network system (for example, an HEW WLAN system) to which a scheduling mode is introduced and that has 14 bytes in total. A Frame Control field has two bytes, and a value of the field is a value not used yet by identification information of a control frame stipulated in the IEEE 802.11 standard and may be, for example, 0100. A STA in a BSS can distinguish according to the value that the control frame is a frame dedicated to the HEW WLAN system, and another conventional STA may also learn according to the value that the control frame is not sent to the another conventional STA and the another conventional STA cannot use a channel within a subsequent period of time. A duration field has two bytes, is set to duration of occupying a subsequent channel, and includes subsequent scheduling duration, m times of SIFS duration, and the sum of duration of n control frames. An RA has six bytes, and may be set to, for example, a parameter or a numerical value agreed in advance by a communications device in the BSS. FCS information has four bytes, the same as an FCS of the control frame stipulated in the IEEE 802.11 standard. The format of the control frame in this embodiment may be the same as a format of the control frame stipulated in the IEEE 802.11 standard, so that all STAs, including STAs in a BSS and conventional STAs, can receive and demodulate the control frame. Each control frame occupies a bandwidth of 20 MHz, the bandwidth of 20 MHz has 64 subcarriers, a quantity and positions of pilot subcarriers are the same as those of control frames in the IEEE 802.11 standard. If there is a bandwidth of 80 MHz, a control frame is separately sent on each bandwidth of 20 MHz. The control frame differs from the control frame in the IEEE 802.11 standard in content of the Frame Control field, the duration field, and the RA. Because the RA is a pre-agreed value, all STAs in the BSS can demodulate the value.

Further, when the communications device is a STA, the exchange module 12 is configured to send the control frame to the another communications device in the wireless network using the first channel succeeding in contention and the second channel considered to succeed in contention that are determined by the first submodule, to occupy the channels; send the control frame to the another communications device in the wireless network using the first channel succeeding in contention that is determined by the second submodule, to occupy the channels; and exchange the data frame with the another communications device in the wireless network using the first channel succeeding in contention that is determined by the second submodule.

Further, when the communications device is a STA, the exchange module 12 is configured to send the control frame to the another communications device in the wireless network using the first channel succeeding in contention and the second channel considered to succeed in contention that are determined by the first submodule, to occupy the channels; send the control frame to the another communications device in the wireless network using the first channel succeeding in contention and the second channel considered to succeed in contention that are determined by the second submodule, to occupy the channels; and exchange the data frame with the another communications device in the wireless network using the first channel succeeding in contention that is determined by the second submodule.

Further, when the communications device is an AP, the exchange module 12 is configured to send the control frame to the another communications device in the wireless network using the first channel succeeding in contention and the second channel considered to succeed in contention that are determined by the first submodule, to occupy the channels; and exchange the data frame with the another communications device in the wireless network using the first channel succeeding in contention that is determined by second submodule.

Further, when the communications device is an AP, the exchange module 12 is configured to send the control frame to the another communications device in the wireless network using the first channel succeeding in contention and the second channel considered to succeed in contention that are determined by the first submodule, to occupy the channels; send the control frame to the another communications device in the wireless network using the first channel succeeding in contention and the second channel considered to succeed in contention that are determined by the second submodule, to occupy the channels; and exchange the data frame with the another communications device in the wireless network using the first channel succeeding in contention that is determined by the second submodule.

The technical solutions of any one of communications device embodiments in FIG. 1 to FIG. 4 are described in detail below using several specific embodiments.

Figure 5:
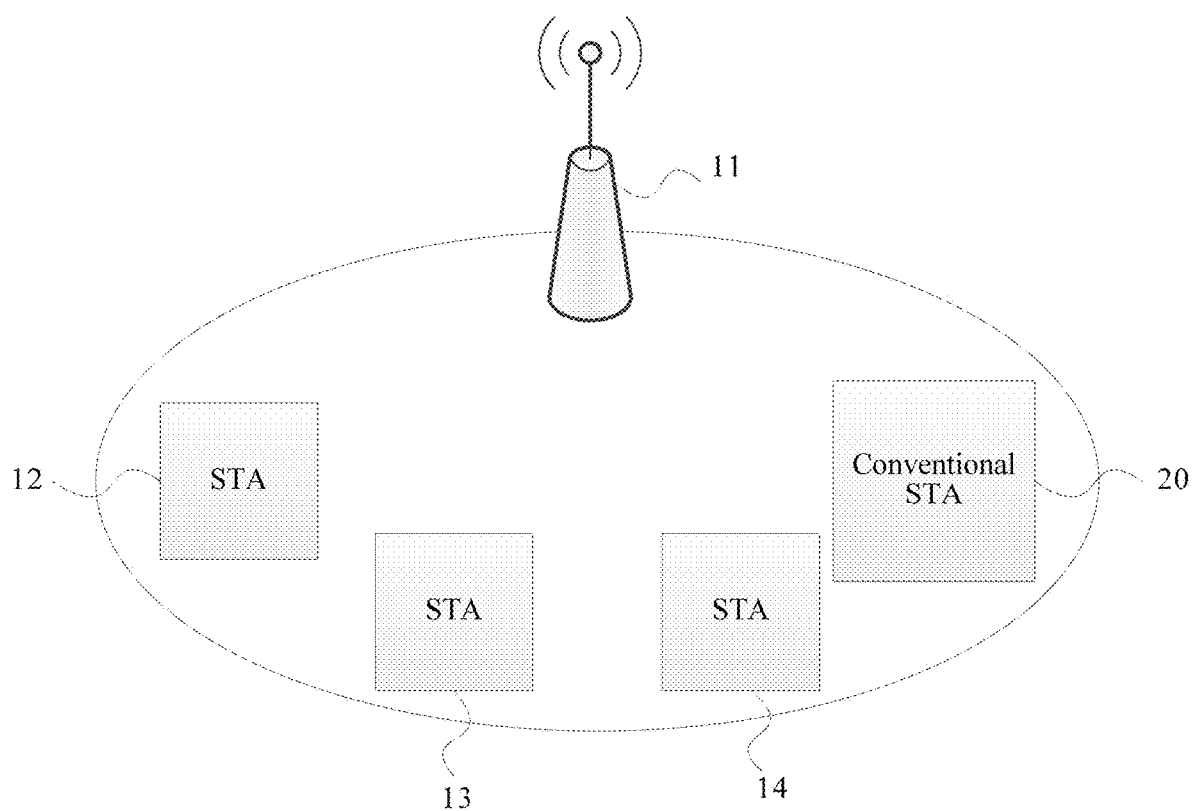
FIG. 5 is a schematic structural diagram of an embodiment of a wireless network system according to the present disclosure.

FIG. 5 is a schematic structural diagram of an embodiment of a wireless network system according to the present disclosure. As shown in FIG. 5, the wireless network system may include at least two communications devices, where one communications device is the STA shown in FIG. 1 or FIG. 2, and the other communications device is the AP shown in FIG. 1 or FIG. 2; the STA and the AP are separately configured to listen to at least two channels, and exchange a control frame using a first channel succeeding in contention and a second channel considered to succeed in contention, to occupy the channels, or exchange a data frame.

The wireless network system includes one BSS, and the BSS includes one AP 11, and three STAs, that is, STAs 12, 13, and 14. The AP 11 and the STAs 12, 13, and 14 all listen to at least two channels and participate in contending for multiple channels. In addition, the wireless network system may further include a conventional STA 20, and the conventional STA 20 may be a station belonging to the BSS and meeting the existing IEEE 802.11 standard, or a station not belonging to the BSS but meeting the existing IEEE 802.11 standard.

In the present disclosure, the communications device in the BSS may exchange information using the control frame. Because the conventional STA 20 needs to listen to channels to send data, these control frames may also be obtained by means of listening by the conventional STA 20. The conventional STA 20 sets, according to these control frames, to learn which channels are occupied and perform contention backoff.

Figure 6:
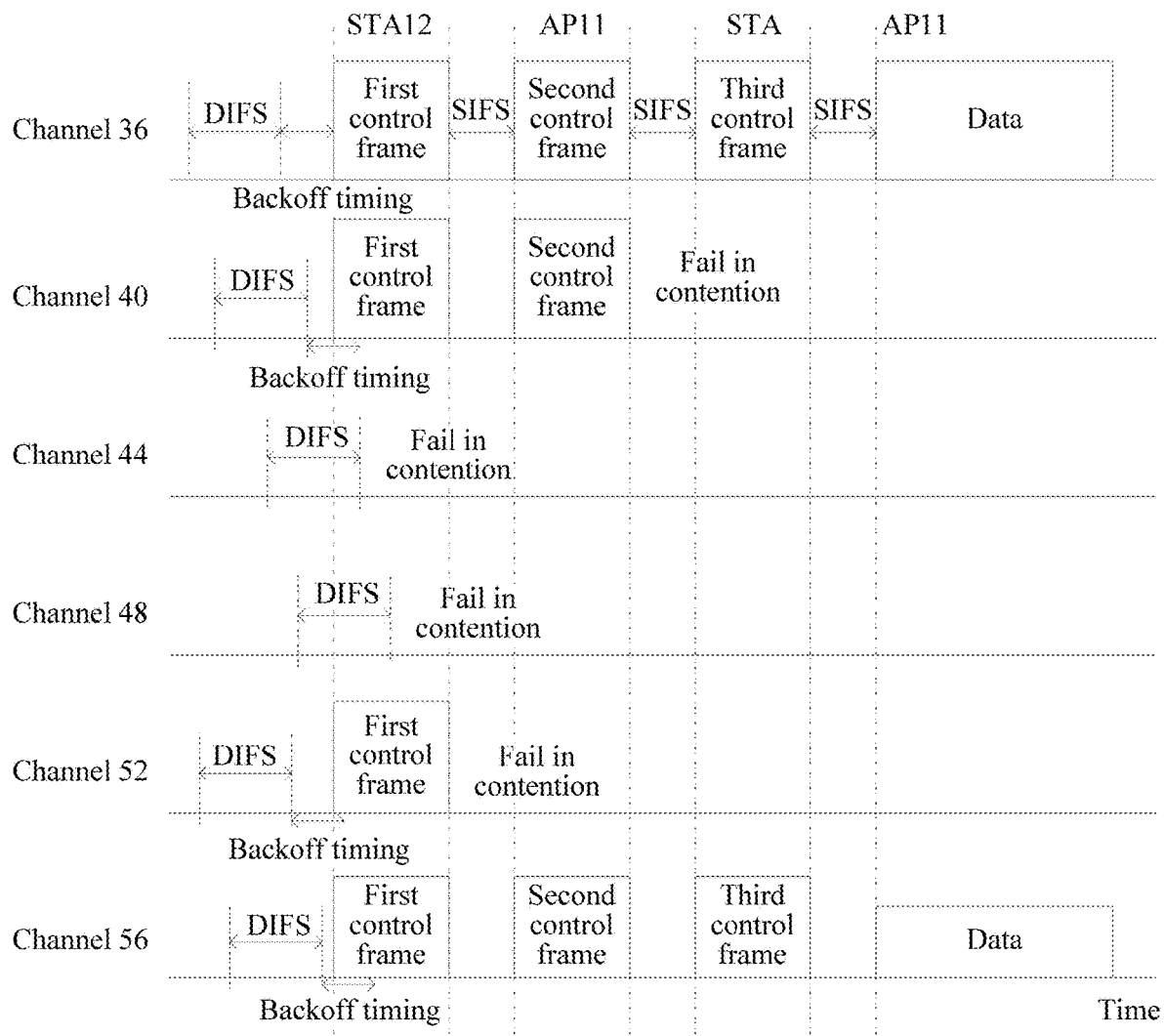
FIG. 6 is a schematic diagram of a contention mechanism in Embodiment 3 of a communications device applied to a wireless network according to the present disclosure.

FIG. 6 is a schematic diagram of a contention mechanism in Embodiment 3 of a communications device applied to a wireless network according to the present disclosure. As shown in FIG. 6, the wireless network in this embodiment may use the structure shown in FIG. 5, and the communications device in this embodiment is any STA in the BSS, and is assumed to be the STA 12. The contention mechanism in this embodiment includes the following.

The STA 12 determines that a first channel is a channel 36, second channels include a channel 40, a channel 52, and a channel 56, and a channel 44 and a channel 48 are considered not to succeed in contention because the channel 44 and the channel 48 do not enter a backoff timing phase. The STA 12 sends a first control frame to the AP 11 using the first channel and the second channel.

The AP 11 sends a second control frame using a channel that receives the first control frame, the STA 12 sends the first control frame on the channel 36, the channel 40, the channel 52, and the channel 56, and the AP 11 may receive the first control frame on only the channel 36, the channel 40, and the channel 56. Therefore, the AP 11 sends the second control frame on the channel 36, the channel 40, and the channel 56. Because an RA is a pre-agreed value, all STAs in the BSS can demodulate the value. The AP 11 sends the second control frame for the situation in which some STAs (for example, the STA 13) do not receive the first control frame sent by the STA 12; in this way, the STAs in the BSS can all learn that a channel is successfully obtained by means of contention.

A STA sends a third control frame using a channel that receives the second control frame; the AP sends the second control frame on the channel 36, the channel 40, and the channel 56, and the STA receives the second control frame on only the channel 36 and the channel 56. Therefore, the STA sends the third control frame on the channel 36 and the channel 56. The STA herein may be one or more of all stations that receive the second control frame, for example, the STAs 12, 13, and 14. Because the RA is a pre-agreed value, all the STAs in the BSS can demodulate the value. The STA sends the third control frame for the situation in which some STAs (for example, a STA 14) do not receive all the previous control frames; in this way, the STAs in the BSS can all learn that a channel is successfully obtained by means of contention.

The AP 11 may further perform centralized control scheduling, so that at least two communications devices in the BSS can all use multiple channels to transmit data; after receiving, on the channel 36 and the channel 56, the third control frame sent by the STA, the AP 11 determines that the BSS succeeds in obtaining by means of contention the channel 36 and the channel 56. Therefore, it is prepared to send a control frame or a data frame on the channel 36 and the channel 56; in this case, the BSS enters a scheduling mode, and the AP 11 performs centralized control scheduling.

The conventional STA 20 learns using the foregoing control frames that channels carrying the control frames are occupied, that is, the channel 36, the channel 40, the channel 52, and the channel 56 are occupied, and the conventional STA 20 cannot use these channels; and the conventional STA 20 sets a network allocation vector (NAV) of the conventional STA 20 according to the control frames; the conventional STA 20 sets the NAV of the conventional STA 20 according to duration fields in the control frames.

In this embodiment, a STA in a BSS may not distinguish a primary-secondary relationship of channels and may not necessarily contend for channels in sequence according to priorities as in the prior art, but may synchronously determine a first channel and a second channel that succeed in contention, and then exchange information with another communications device using the first channel and the second channel, to achieve an objective that at least two communications devices in the BSS use multiple channels to transmit data, which not only improves a success rate of channel contention, but also prevents massive bandwidth waste.

Figure 7:
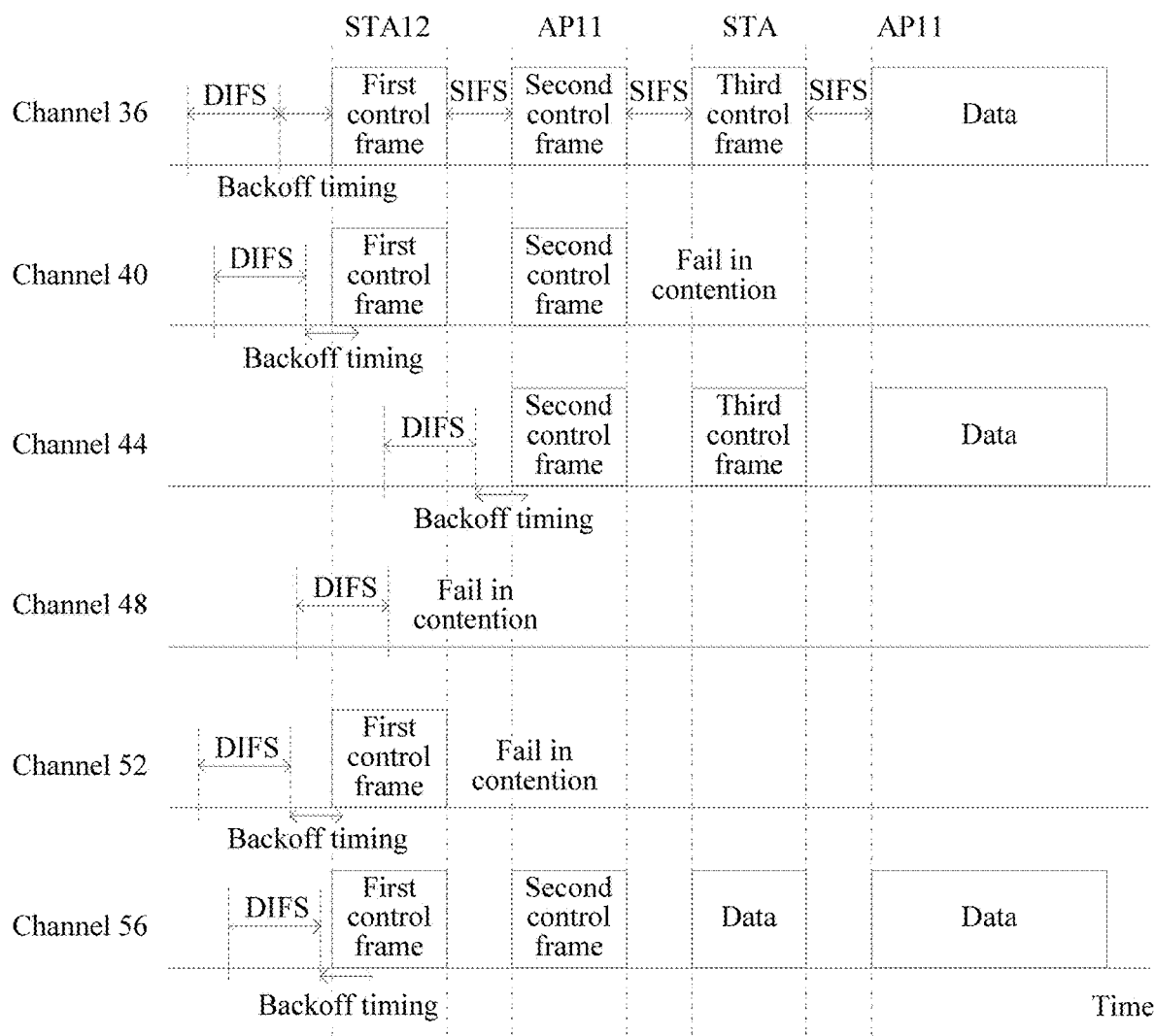
FIG. 7 is a schematic diagram of a contention mechanism in Embodiment 4 of a communications device applied to a wireless network according to the present disclosure.

FIG. 7 is a schematic diagram of a contention mechanism in Embodiment 4 of a communications device applied to a wireless network according to the present disclosure. As shown in FIG. 7, the wireless network in this embodiment may use the structure shown in FIG. 5, and the communications device in this embodiment is any STA in the BSS, and is assumed to be the STA 12. Based on the contention mechanism shown in FIG. 6, the contention mechanism in this embodiment further includes the following.

When receiving the first control frame sent by the STA 12, the AP 11 determines the second channel considered to succeed in contention. After receiving the first control frame on the channel 36, the channel 40, and the channel 56, the AP 11 determines that besides the channel 36, the channel 40, and the channel 56, the channel 44 that currently does not receive the first control frame but that is in a corresponding backoff timing phase and that is in an idle state is the second channel considered to succeed in contention.

The AP 11 sends the second control frame using the channel that receives the first control frame and the second channel considered to succeed in contention. In this embodiment, the AP 11 sends the second control frame on the channel 36, the channel 40, the channel 56, and the channel 44.

The conventional STA 20 learns using the foregoing control frames that channels carrying the control frames are occupied, that is, the channel 36, the channel 40, the channel 44, the channel 52, and the channel 56 are occupied, and the conventional STA 20 cannot use these channels; and the conventional STA 20 sets the NAV of the conventional STA 20 according to the control frames; the conventional STA 20 sets the NAV of the conventional STA 20 according to duration fields in the control frames.

In this embodiment, as a device for receiving a control frame, an AP 11 may also determine a second channel considered to succeed in contention, add channels available to a system, and aggregate available channels as many as possible, which not only enlarges a bandwidth and improves a data speed, but also prevents bandwidth waste.

Figure 8:
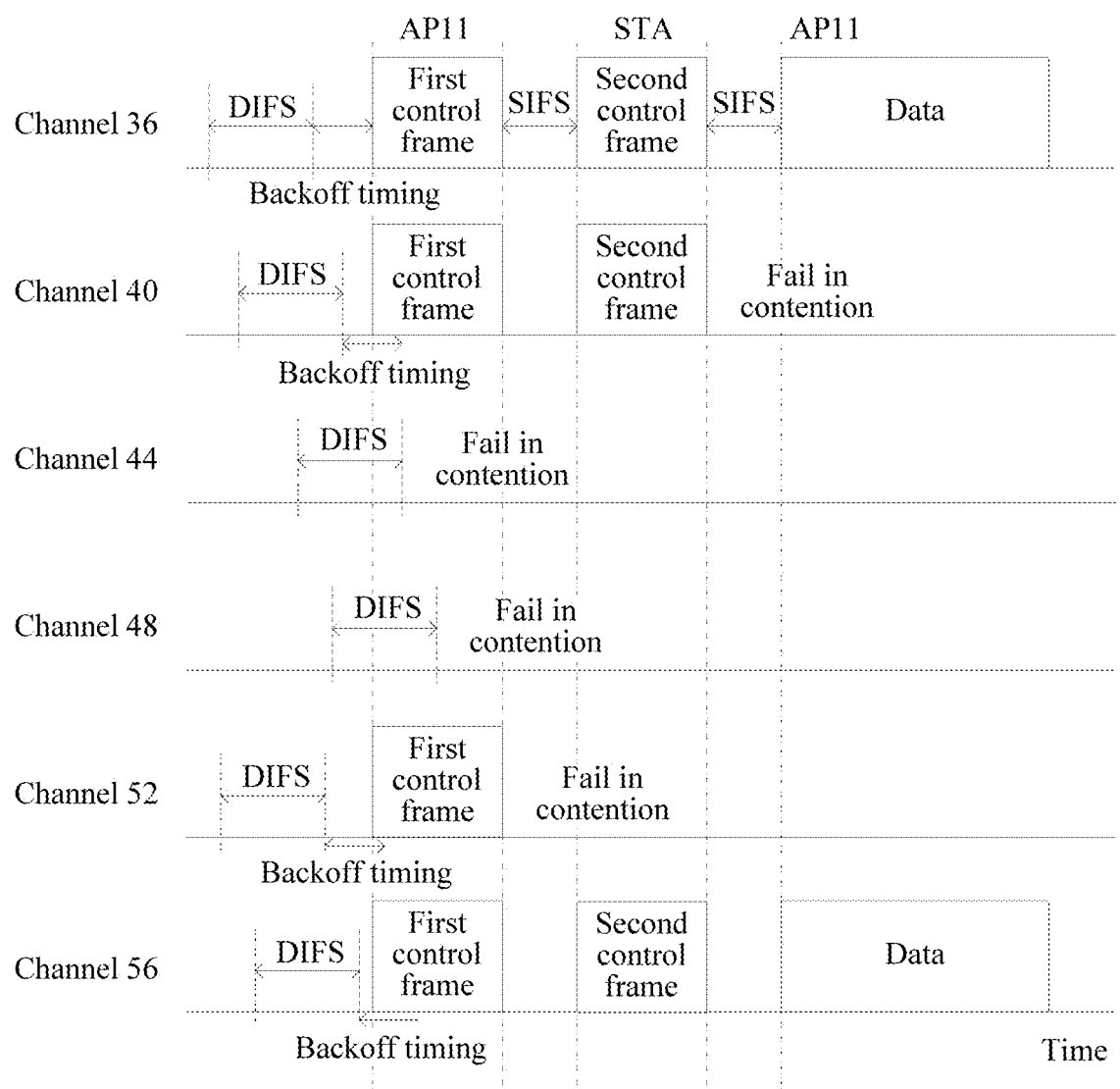
FIG. 8 is a schematic diagram of a contention mechanism in Embodiment 5 of a communications device applied to a wireless network according to the present disclosure.

FIG. 8 is a schematic diagram of a contention mechanism in Embodiment 5 of a communications device applied to a wireless network according to the present disclosure. As shown in FIG. 8, the wireless network in this embodiment may use the structure shown in FIG. 5, and the communications device in this embodiment is the AP 11 in the BSS. The contention mechanism in this embodiment includes the following.

The AP 11 determines that a first channel is a channel 36, second channels include a channel 40, a channel 52, and a channel 56, and a channel 44 and a channel 48 are considered not to succeed in contention because the channel 44 and the channel 48 do not enter a backoff timing phase. The AP 11 sends a first control frame to a STA using the first channel and the second channel. Because an RA is a pre-agreed value, all STAs in the BSS can demodulate the value.

The STA sends a second control frame using a channel that receives the first control frame, the AP 11 sends the first control frame on the channel 36, the channel 40, the channel 52, and the channel 56, and the STA (any one or more of the STAs 12, 13, and 14) may receive the first control frame on only the channel 36, the channel 40, and the channel 56. Therefore, the STA sends the second control frame on the channel 36, the channel 40, and the channel 56. Because the RA is a pre-agreed value, all the STAs in the BSS and the AP 11 can demodulate the value. The STA sends the second control frame for the situation in which some STAs (for example, the STA 13) do not receive the first control frame; in this way, the STAs in the BSS can all learn that a channel is successfully obtained by means of contention.

The AP 11 performs centralized control scheduling, so that at least two communications devices in the BSS can all use multiple channels to transmit data; after receiving the second control frame on the channel 36 and the channel 56, the AP 11 determines that the BSS succeeds in obtaining by means of contention the channel 36 and the channel 56. Therefore, it is prepared to send a control frame or a data frame on the channel 36 and the channel 56, in this case, the BSS enters a scheduling mode, and the AP 11 performs centralized control scheduling.

The conventional STA 20 learns using the foregoing control frames that channels carrying the control frames are occupied, that is, the channel 36, the channel 40, the channel 52, and the channel 56 are occupied, and the conventional STA 20 cannot use these channels; and the conventional STA 20 sets an NAV of the conventional STA 20 according to the control frames; the conventional STA 20 sets the NAV of the conventional STA 20 according to duration fields in the control frames.

In this embodiment, an AP 11 in a BSS may not distinguish a primary-secondary relationship of channels and may not necessarily contend for channels in sequence according to priorities as in the prior art, but may synchronously determine a first channel and a second channel that succeed in contention, and then exchange information with another communications device using the first channel and the second channel, to achieve an objective that at least two communications devices in the BSS use multiple channels to transmit data, which not only improves a success rate of channel contention, but also prevents massive bandwidth waste.

Figure 9:
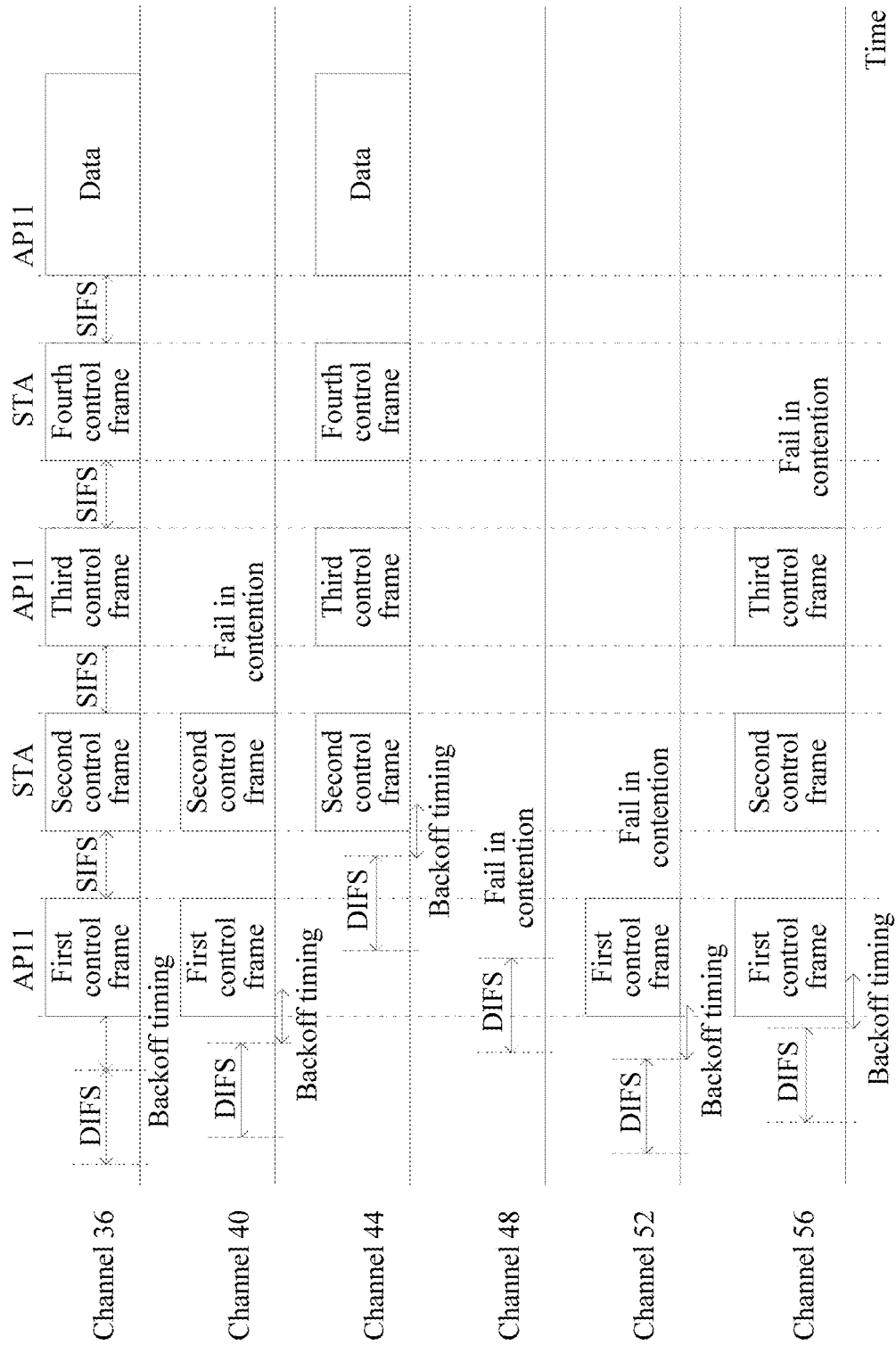
FIG. 9 is a schematic diagram of a contention mechanism in Embodiment 6 of a communications device applied to a wireless network according to the present disclosure.

FIG. 9 is a schematic diagram of a contention mechanism in Embodiment 6 of a communications device applied to a wireless network according to the present disclosure. As shown in FIG. 9, the wireless network in this embodiment may use the structure shown in FIG. 5, and the communications device in this embodiment is the AP 11 in the BSS. Based on the contention mechanism shown in FIG. 8, the contention mechanism in this embodiment further includes the following.

When receiving the first control frame sent by the AP 11, a STA (any one or more of the STAs 12, 13, and 14) determines the second channel considered to succeed in contention. After receiving the first control frame on the channel 36, the channel 40, and the channel 56, the STA determines that besides the channel 36, the channel 40, and the channel 56, the channel 44 that currently does not receive the first control frame but that is in a corresponding backoff timing phase and that is in an idle state is the second channel considered to succeed in contention.

The STA sends the second control frame using the channel that receives the first control frame and the second channel considered to succeed in contention. In this embodiment, the STA sends the second control frame on the channel 36, the channel 40, the channel 56, and the channel 44.

The AP 11 sends a third control frame using a channel that receives the second control frame, the STA sends the second control frame on the channel 36, the channel 40, the channel 44, and the channel 56, and the AP 11 may receive the second control frame on only the channel 36, the channel 44, and the channel 56. Therefore, the AP 11 sends the third control frame on the channel 36, the channel 44, and the channel 56. Because the RA is a pre-agreed value, all the STAs in the BSS can demodulate the value. The AP 11 sends the third control frame for the situation in which some STAs (for example, a first STA 13) do not receive all the previous control frames; in this way, the STAs in the BSS can all learn that a channel is successfully obtained by means of contention.

The STA (any one or more of the STAs 12, 13, and 14) sends a fourth control frame using a channel that receives the third control frame, the AP 11 sends the third control frame on the channel 36, the channel 44, and the channel 56, and the STA may receive the third control frame on only the channel 36 and the channel 44. Therefore, the STA sends the fourth control frame on the channel 36 and the channel 44.

The conventional STA 20 learns using the foregoing control frames that channels carrying the control frames are occupied, that is, the channel 36, the channel 40, the channel 44, the channel 52, and the channel 56 are occupied, and sets the NAV of conventional STA 20 according to the control frames.

In this embodiment, as a device for receiving a control frame, a STA may also determine a second channel considered to succeed in contention, add channels available to a system, and aggregate available channels as many as possible, which not only enlarges a bandwidth and improves a data speed, but also prevents bandwidth waste.

Figure 10:
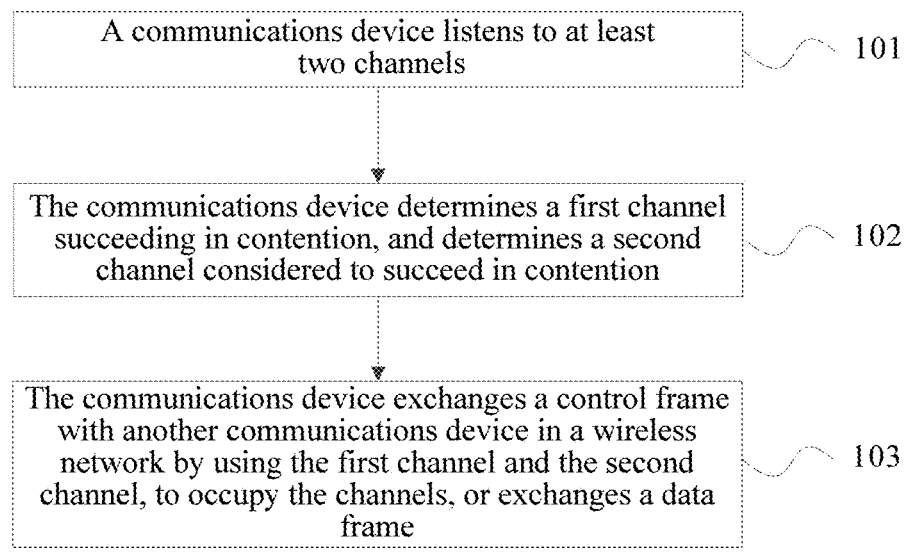
FIG. 10 is a flowchart of Embodiment 1 of a multi-channel contention method according to the present disclosure.

FIG. 10 is a flowchart of Embodiment 1 of a multi-channel contention method according to the present disclosure. As shown in FIG. 10, the method in this embodiment may include the following steps.

Step 101: A communications device listens to at least two channels.

The communications device in this embodiment belongs to a BSS, the BSS is a basic service set of a wireless network to which a scheduling mode is introduced and that includes an AP and at least two STAs; the AP and the at least two STAs all participate in channel contention, and the communications device may be the AP or any STA in the BSS. The AP and the STAs in the BSS in the present disclosure all participate in contending for multiple channels, which can improve a success rate of channel contention of the whole BSS.

Step 102: The communications device determines a first channel succeeding in contention, and determines a second channel considered to succeed in contention.

In this embodiment, the communications device determines the first channel succeeding in contention, and determines the second channel considered to succeed in contention. The first channel and the second channel herein may separately be one or more channels, and these channels are not distinguished by a priority, that is, any channel of the at least two channels that are listened to in step 101 may be the first channel or the second channel.

Step 103: The communications device exchanges a control frame with another communications device in a wireless network using the first channel and the second channel, to occupy the channels, or exchanges a data frame.

In this embodiment, after obtaining by means of contention the first channel and the second channel, the communications device performs exchange, including control frame exchange and data frame exchange, with the another communications device in the wireless network using the first channel and the second channel. Regardless of whether the communications device is the AP or the STA, after obtaining by means of contention channels, the communications device exchanges information with the another communications device, so that all STAs in the BSS learn that channel contention is successful; afterwards, the BSS enters a scheduling mode, and performs centralized control scheduling using the AP.

In this embodiment, a communications device in a BSS may synchronously determine a first channel succeeding in contention and a second channel considered to succeed in contention, then perform exchange with another communications device using the first channel and the second channel, and perform centralized scheduling using an AP to achieve an objective that at least two communications devices in the BSS use multiple channels to transmit data, which not only improves a success rate of channel contention, but also prevents massive bandwidth waste.

The control frame includes a Frame Control field used to identify the control frame and a duration field used to record duration of occupying a subsequent channel, and may be HEW-RTS, HEW-CTS, or HEW-ACK. The control frame of the present disclosure may use the frame structure shown in FIG. 3 or FIG. 4.

Further, a specific implementation method of step 102, in the foregoing method embodiment, of determining, by the communications device, a first channel succeeding in contention, and determines a second channel considered to succeed in contention may be entering a waiting phase when the communications device obtains by means of listening that any channel of the at least two channels is in an idle state, and if the any channel is still in an idle state after the waiting phase, determining that the any channel enters a backoff timing phase; and determining, by the communications device, a channel that is still in an idle state after a corresponding backoff timing phase ends as the first channel succeeding in contention, and determining another channel that is currently still in a corresponding backoff timing phase and that is in an idle state as the second channel considered to succeed in contention.

When listening to multiple channels, the communications device finds that any channel of the at least two channels is in an idle state, and enters the waiting phase. Duration of the waiting phase may be an xIFS, and the xIFS may be duration defined in a standard, such as an SIFS, a PIFS, a DIFS, or an AIFS. After the communications device waits for duration of the xIFS, if the any channel is still in an idle state, the any channel enters the backoff timing phase, where backoff timing may be a counter in which the communications device presets backoff duration; when the any channel enters the backoff timing phase, the counter starts to count down, that timing ends is that the backoff timing phase ends. The communications device determines a channel that is still in an idle state after a corresponding backoff timing phase ends as the first channel succeeding in contention, that is, as long as a counter on any channel returns to zero, it indicates that the channel succeeds in contention; it is not excluded that there are multiple channels that synchronously return to zero, and these channels all succeed in contention, which is not limited in the present disclosure. In addition, the communications device determines another channel that is currently still in a corresponding backoff timing phase and that is in an idle state as the second channel considered to succeed in contention.

Further, before step 102 in the foregoing method embodiment, the method further includes receiving, by the communications device, a first control frame from the another communications device, where a specific implementation method of step 102 of determining, by the communications device, a first channel succeeding in contention, and determining a second channel considered to succeed in contention may be determining, by the communications device, a channel that receives the first control frame as the first channel succeeding in contention, and determining another channel that currently does not receive the control frame but that is in a corresponding backoff timing phase and that is in an idle state as the second channel considered to succeed in contention.

The communications device as a receiver device first receives the first control frame sent by the another communications device, then the communications device determines the channel that receives the first control frame as the first channel succeeding in contention, and determines another channel that currently does not receive the control frame but that is in a corresponding backoff timing phase and that is in an idle state as the second channel considered to succeed in contention, that is, the communications device as a receiver device may also determine the second channel considered to succeed in contention from channels that do not receive the control frame, thereby avoiding omission of an available channel.

The technical solutions of the method embodiment shown in FIG. 10 are described in detail below using several specific embodiments.

Figure 11:
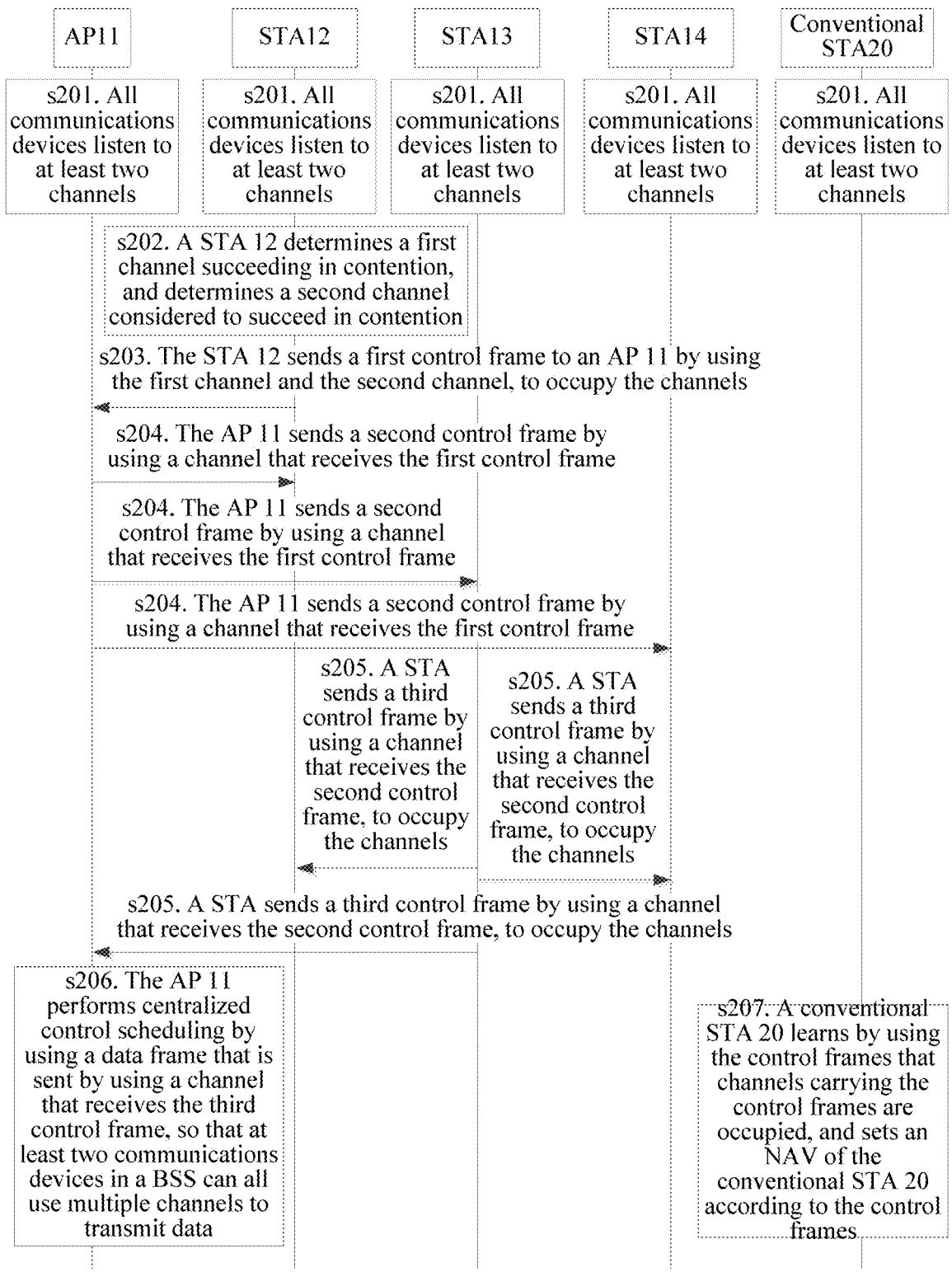
FIG. 11 is a flowchart of Embodiment 2 of a multi-channel contention method according to the present disclosure.

FIG. 11 is a flowchart of Embodiment 2 of a multi-channel contention method according to the present disclosure. As shown in FIG. 11, the method in this embodiment is applicable to the structure shown in FIG. 5, and the communications device in this embodiment is any STA in a BSS and is assumed to be the STA 12. The method in this embodiment may include the following steps.

S201: All communications devices listen to at least two channels.

In this embodiment, a process in which all the communications devices in the BSS listen to the at least two channels is similar to that of step 101 in the foregoing method embodiment and is not described in detail herein again.

S202: The STA 12 determines a first channel succeeding in contention, and determines a second channel considered to succeed in contention.

In this embodiment, a process in which the STA 12 determines the first channel succeeding in contention, and determines the second channel considered to succeed in contention is similar to that of step 102 in the foregoing method embodiment and is not described in detail herein again.

S203: The STA 12 sends a first control frame to the AP 11 using the first channel and the second channel, to occupy the channels.

In this embodiment, the first control frame may use the frame structure shown in FIG. 3.

S204: The AP 11 sends a second control frame using a channel that receives the first control frame.

In this embodiment, the second control frame may use the frame structure shown in FIG. 4.

S205: A STA sends a third control frame using a channel that receives the second control frame, to occupy the channels.

In this embodiment, the third control frame may use the frame structure shown in FIG. 4. The STA may be any one or more of the STAs 12, 13, and 14, and an example in which the STA is the STA 13 is used in this embodiment.

S206: The AP 11 performs centralized control scheduling using a data frame that is sent using a channel that receives the third control frame, so that at least two communications devices in a BSS can all use multiple channels to transmit data.

S207: The conventional STA 20 learns using the control frames that channels carrying the control frames are occupied, and sets an NAV of the conventional STA 20 according to the control frames.

An implementation process of S203 to S206 is similar to the contention mechanism in Embodiment 3 of the communications device applied to the wireless network shown in FIG. 6 and is not described in detail herein again.

Figure 12:
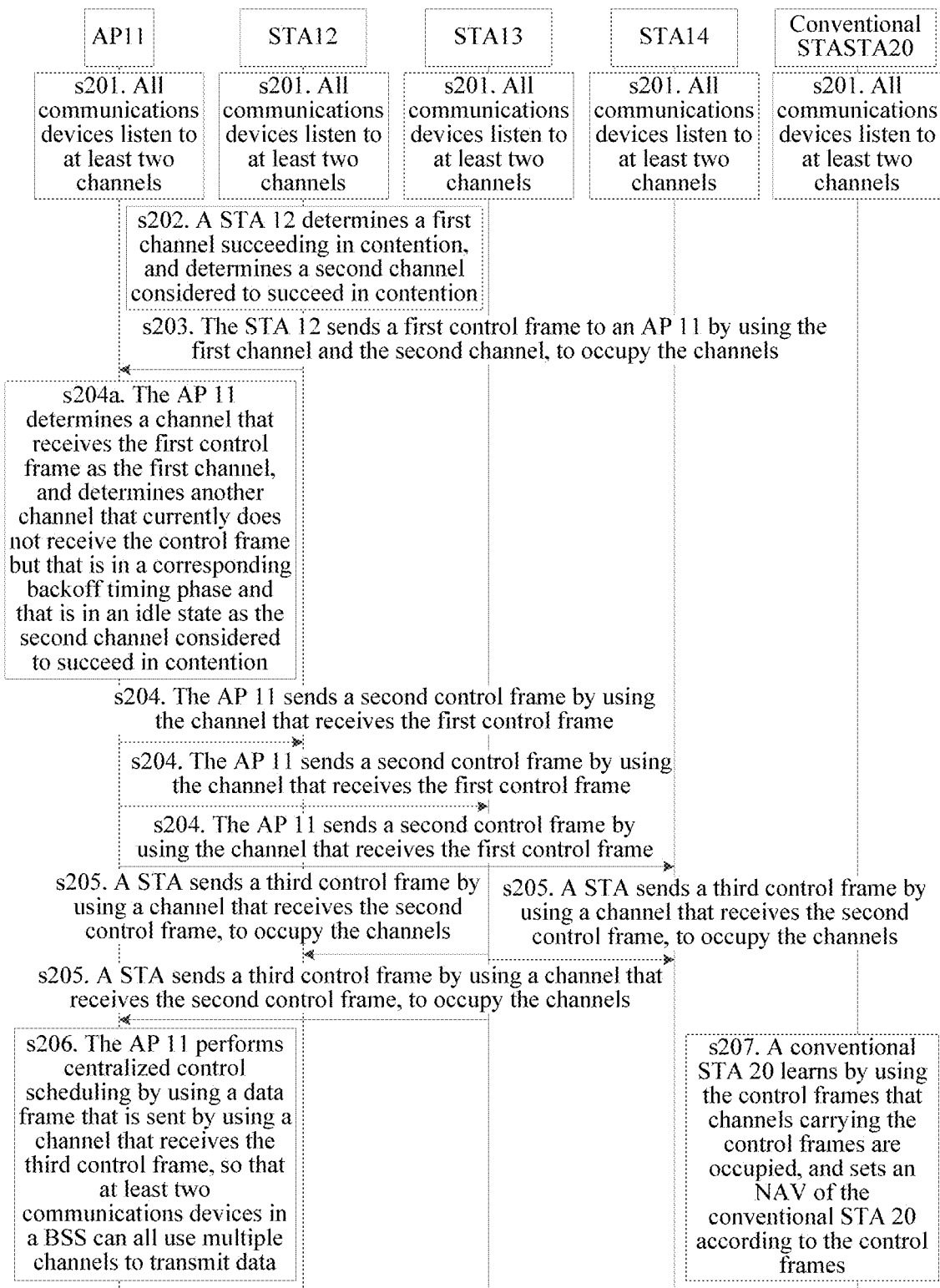
FIG. 12 is a flowchart of Embodiment 3 of a multi-channel contention method according to the present disclosure.

FIG. 12 is a flowchart of Embodiment 3 of a multi-channel contention method according to the present disclosure. As shown in FIG. 12, based on the method embodiment shown in FIG. 11, before S204 of sending, by the AP 11, a second control frame using a channel that receives the first control frame, the method in this embodiment further includes S204a. The AP 11 determines the channel that receives the first control frame as the first channel, and determines another channel that currently does not receive the control frame but that is in a corresponding backoff timing phase and that is in an idle state as the second channel considered to succeed in contention. In S204, the AP 11 sends the second control frame using both the first channel that receives the first control frame and the second channel.

An implementation process is similar to the contention mechanism in Embodiment 4 of the communications device applied to the wireless network shown in FIG. 7 and is not described in detail herein again.

Figure 13:
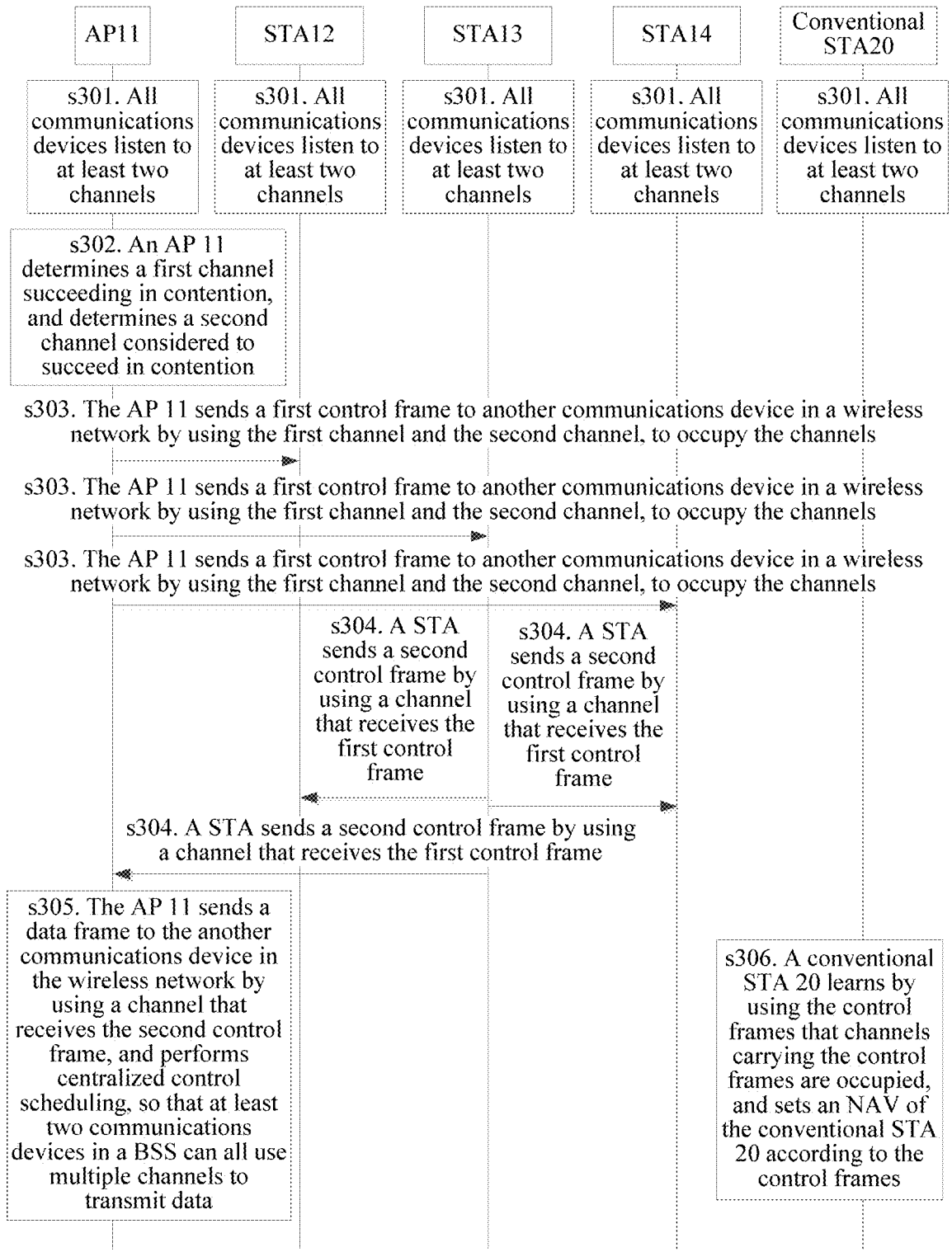
FIG. 13 is a flowchart of Embodiment 4 of a multi-channel contention method according to the present disclosure.

FIG. 13 is a flowchart of Embodiment 4 of a multi-channel contention method according to the present disclosure. As shown in FIG. 13, the method in this embodiment is applicable to the structure shown in FIG. 5, and the communications device in this embodiment is the AP 11 in the BSS. The method in this embodiment may include the following steps.

S301: All communications devices listen to at least two channels.

In this embodiment, a process in which the communications device listens to the at least two channels is similar to that of step 101 in the foregoing method embodiment and is not described in detail herein again.

S302: The AP 11 determines a first channel succeeding in contention, and determines a second channel considered to succeed in contention.

In this embodiment, a process in which the AP 11 determines the first channel succeeding in contention, and determines the second channel considered to succeed in contention is similar to that of step 102 in the foregoing method embodiment and is not described in detail herein again.

S303: The AP 11 sends a first control frame to another communications device in a wireless network using the first channel and the second channel, to occupy the channels.

In this embodiment, the first control frame may use the frame structure shown in FIG. 3.

S304: The STA sends a second control frame using a channel that receives the first control frame.

In this embodiment, the second control frame may use the frame structure shown in FIG. 4. The STA may be any one or more of the STAs 12, 13, and 14, and an example in which the STA is the STA 13 is used in this embodiment.

S305: The AP 11 sends a data frame to the another communications device in the wireless network using a channel that receives the second control frame, and performs centralized control scheduling, so that at least two communications devices in the BSS can all use multiple channels to transmit data.

S306: The conventional STA 20 learns using the control frames that channels carrying the control frames are occupied, and sets an NAV of the conventional STA 20 according to the control frames.

An implementation process of S303 to S305 is similar to the contention mechanism in Embodiment 5 of the communications device applied to the wireless network shown in FIG. 8 and is not described in detail herein again.

Figure 14A:
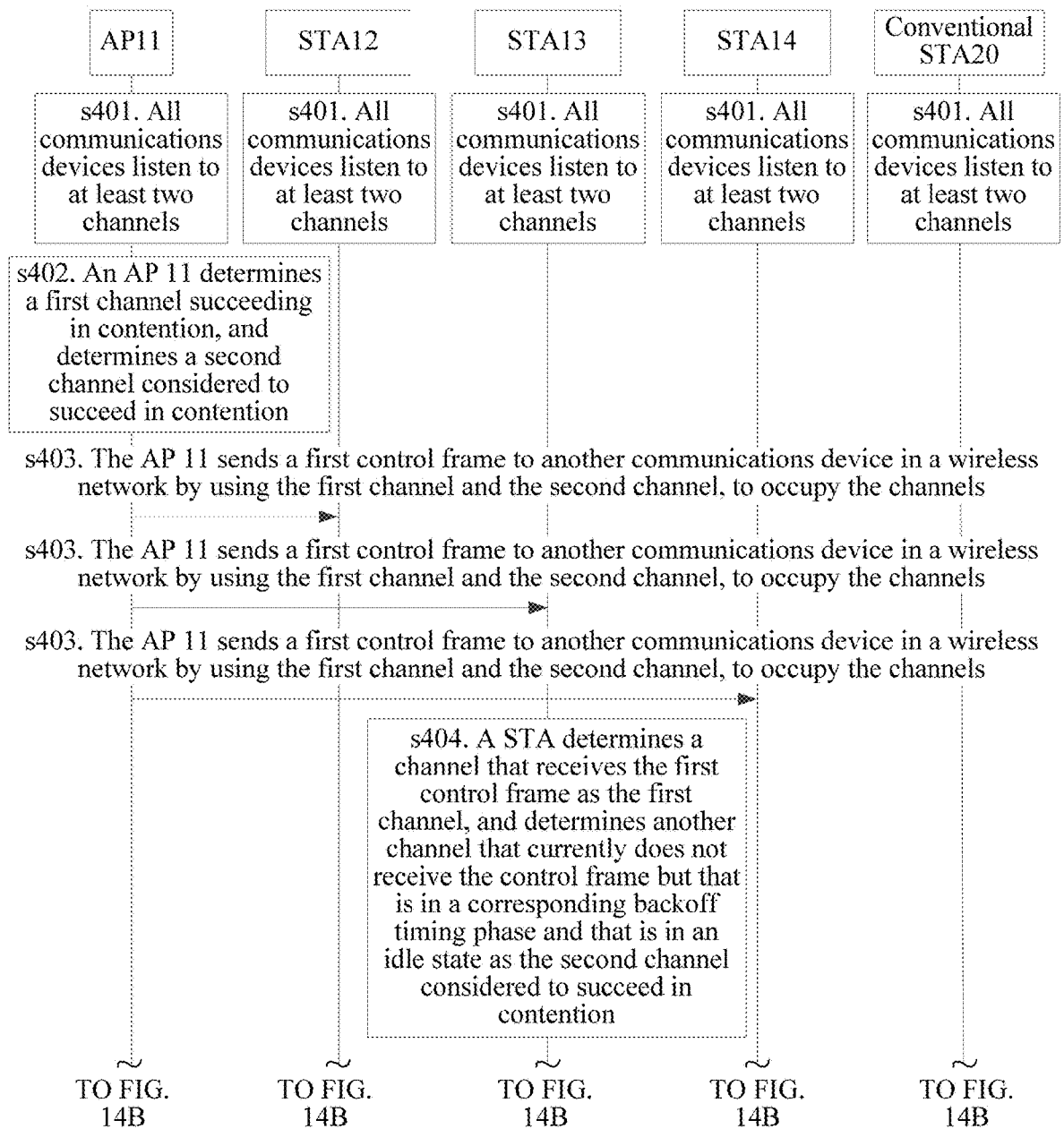
FIG. 14A and FIG. 14B are a flowchart of Embodiment 5 of a multi-channel contention method according to the present disclosure.
Figure 14B:
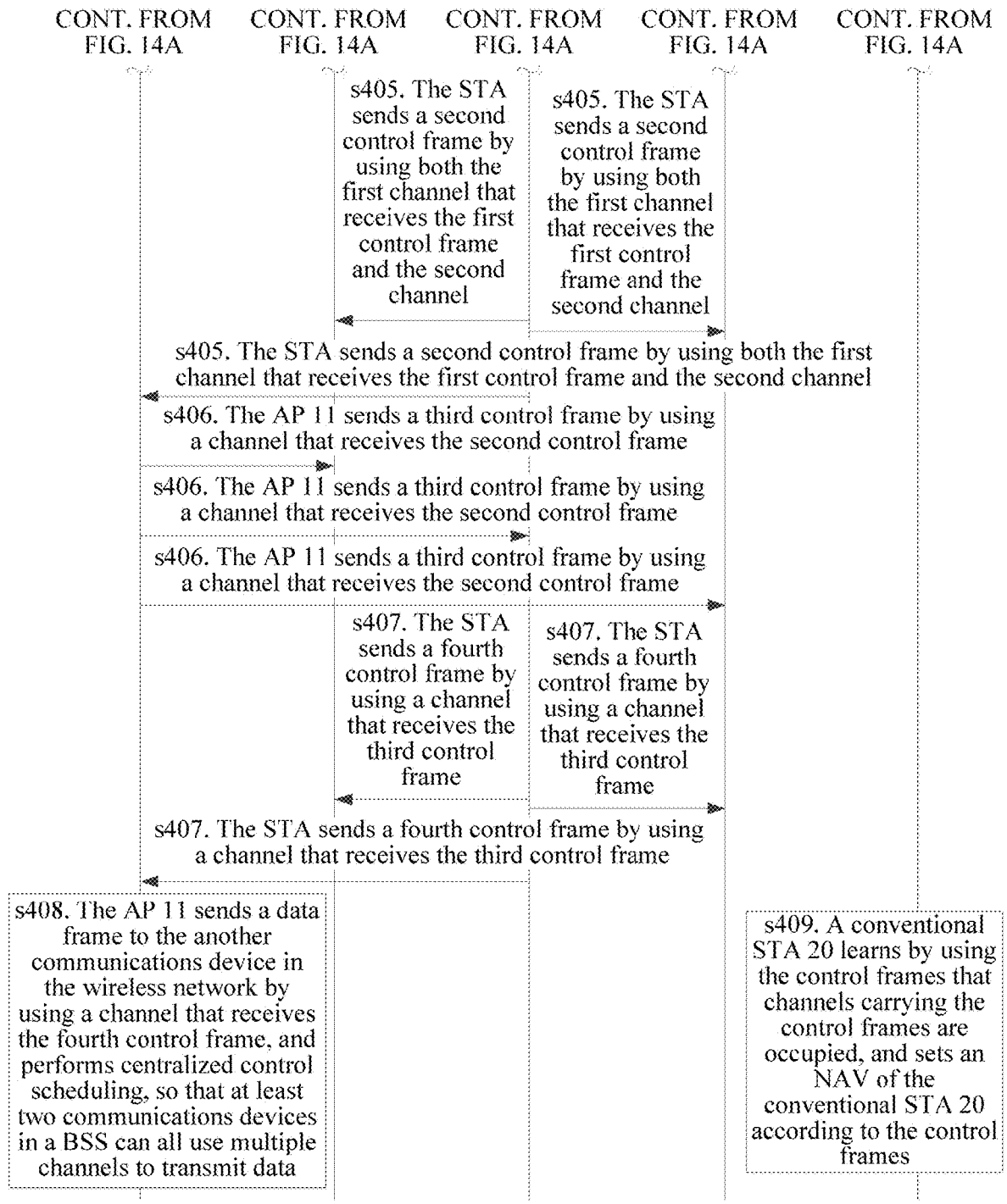

FIG. 14A and FIG. 14B are a flowchart of Embodiment 5 of a multi-channel contention method according to the present disclosure. As shown in FIG. 14A and FIG. 14B, the method in this embodiment is applicable to the structure shown in FIG. 5, and the communications device in this embodiment is the AP 11 in the BSS. The method in this embodiment may include the following steps.

S401: All communications devices listen to at least two channels.

In this embodiment, a process in which the communications device listens to the at least two channels is similar to that of step 101 in the foregoing method embodiment and is not described in detail herein again.

S402: The AP 11 determines a first channel succeeding in contention, and determines a second channel considered to succeed in contention.

In this embodiment, a process in which the AP 11 determines the first channel succeeding in contention, and determines the second channel considered to succeed in contention is similar to that of step 102 in the foregoing method embodiment and is not described in detail herein again.

S403: The AP 11 sends a first control frame to another communications device in a wireless network using the first channel and the second channel, to occupy the channels.

In this embodiment, the first control frame may use the frame structure shown in FIG. 3.

S404: A STA determines a channel that receives the first control frame as the first channel, and determines another channel that currently does not receive the control frame but that is in a corresponding backoff timing phase and that is in an idle state as the second channel considered to succeed in contention.

In this embodiment, the STA may be any one or more of the STAs 12, 13, and 14, and an example in which the STA is the STA 13 is used in this embodiment.

S405: The STA sends a second control frame using both the first channel that receives the first control frame and the second channel.

In this embodiment, the second control frame may use the frame structure shown in FIG. 4.

S406: The AP 11 sends a third control frame using a channel that receives the second control frame.

In this embodiment, the third control frame may use the frame structure shown in FIG. 4.

S407: The STA sends a fourth control frame using a channel that receives the third control frame.

In this embodiment, the fourth control frame may use the frame structure shown in FIG. 4.

S408: The AP 11 sends a data frame to the another communications device in the wireless network using a channel that receives the fourth control frame, and performs centralized control scheduling, so that at least two communications devices in the BSS can all use multiple channels to transmit data.

S409: The conventional STA 20 learns using the control frames that channels carrying the control frames are occupied, and sets an NAV of the conventional STA 20 according to the control frames.

An implementation process of S403 to S408 is similar to the contention mechanism in Embodiment 6 of the communications device applied to the wireless network shown in FIG. 9 and is not described in detail herein again.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The station STA in the foregoing implementation manners may also be referred to as an access terminal, a system, a user unit, a user station, a mobile station, a mobile terminal, a remote station, a remote terminal, a mobile device, a user terminal, a terminal, a wireless communications device, a user agent, a user apparatus, or user equipment (UE). The station STA may be a cellular phone, a cordless phone, a Session Initiation Protocol (SIP) phone, a wireless local loop (WLL) station, a personal digital assistant (PDA), a handheld device or a computing device with a radio communication function, or another processing device connected to a radio modem. In addition, an access point may also be referred to as a base station.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A communication device applied to a wireless network comprising an access point (AP), a first station (STA), a second STA, and a third STA, wherein the communication device is the first STA and comprises:
    a memory comprising instructions;

a processor coupled to the memory, wherein the instructions cause the processor to be configured to:
- listen to a plurality of channels comprising a first channel, a second channel, and a third channel;
- determine a channel of the plurality of channels that is in an idle state after a backoff timing phase of the channel ends as the first channel succeeding in contention without designating the first channel as a primary channel;
- determine, after determining the first channel succeeding in contention, other channels of the plurality of channels that are still in a backoff timing phase for the other channels as the second channel and the third channel considered to succeed in contention without designating the second channel or the third channel as secondary channels; and a transmitter coupled to the memory and the processor and configured to send a first control frame to the AP via the first channel, the second channel, and the third channel so as to occupy the first channel, the second channel and the third channel.

2. The communication device of claim 1, wherein the instructions further cause the processor to be configured to:
- enter a waiting phase when any channel of the plurality of channels is in an idle state;
- determine that any of the channels enters the backoff timing phase when any of the channels is still in an idle state after the waiting phase;
- determine the first channel that is still in the idle state after a corresponding backoff timing phase ends as the channel succeeding in contention; and
- determine the second channel and the third channel that is still in a corresponding backoff timing phase and in an idle state as the other channels considered to succeed in contention.

3. The communication device of claim 1, wherein the first control frame comprises a frame control field, a duration field, a receiver address, and a transmitted address, wherein the frame control field identifies the first control frame, wherein the duration field records a duration of occupying a subsequent channel, wherein the receiver address is set to a media access control (MAC) address of the AP, and wherein the transmitted address is set to the MAC address of the first STA.

4. The communication device of claim 1, wherein the first control frame is a high efficiency wireless local area network request to send (HEW-RTS) frames, high efficiency wireless local area network clear to send (HEW-CTS) frames, or high efficiency wireless local area network acknowledgement (HEW-ACK) frames.

5. The communication device of claim 1, wherein the AP, the first STA, the second STA, and the third STA are all part of a basic service set.

6. The communication device of claim 1, wherein the instructions further cause the processor to:
- subsequently receive a second control frame from the AP via the first channel and the second channel, but not the third channel after sending the first control frame; and
- exchange data with the AP using the first channel and the second channel, but not the third channel.

7. The communication device of claim 6, wherein the second control frame comprises a frame control field, a duration field, and a receiver address, wherein the frame control field identifies the second control frame, wherein the duration field records a duration of occupying a subsequent channel, and wherein the receiver address is set to a parameter or a numerical value agreed to in advance by the first STA, the second STA, and the third STA.

8. The communication device of claim 6, wherein the second control frame is a high efficiency wireless local area network request to send (HEW-RTS) frames, high efficiency wireless local area network clear to send (HEW-CTS) frames, or high efficiency wireless local area network acknowledgement (HEW-ACK) frames.

9. The communication device of claim 1, wherein the transmitter is further configured to:
- send a third control frame to the AP via the first channel succeeding in contention and the second channel and the third channel that are considered to succeed in contention so as to occupy the first channel, the second channel and the third channel; and
- exchange a data frame with the AP via the first channel.

10. The communication device of claim 1, wherein the transmitter is further configured to send a third control frame to the AP via the first channel succeeding in contention and the second channel and the third channel that are considered to succeed in contention so as to occupy the first channel, the second channel and the third channel, and wherein the instructions further cause the processor to exchange a data frame with the AP via the channels that receive the third control frame.

11. A multi-channel contention method implemented by a first station (STA) in a wireless network comprising an access point (AP), the first STA, a second STA, and a third STA, wherein the multi-channel contention method comprises:
- listening to a plurality of channels comprising a first channel, a second channel, and a third channel;
- determining a channel of the plurality of channels that is in an idle state after a backoff timing phase of the channel ends as a first channel succeeding in contention without designating the first channel as a primary channel;
- determining, after determining the first channel succeeding in contention, other channels of the plurality of channels that are still in a backoff timing phase for the other channels as the second channel and the third channel considered to succeed in contention without designating the second channel or the third channel as secondary channels; and
- sending a first control frame to the AP via the first channel, the second channel, and the third channel so as tooccupy the first channel, the second channel and the third channel.

12. The multi-channel contention method of claim 11, further comprising:
- entering a waiting phase when any channel of the plurality of channels is in an idle state;
- determining that any of the channels enters the backoff timing phase when any of the channels is still in an idle state after the waiting phase;
- determining the first channel that is still in the idle state after a corresponding backoff timing phase ends as the channel succeeding in contention; and
- determining the second channel and the third channel that is still in a corresponding backoff timing phase and in an idle state as the other channels considered to succeed in contention.

13. The multi-channel contention method of claim 11, wherein the first control frame comprises a frame control field, a duration field, a receiver address, and a transmitted address, wherein the frame control field identifies the first control frame, wherein the duration field records a duration of occupying a subsequent channel, wherein the receiver address is set to a media access control (MAC) address of the AP, and wherein the transmitted address is set to the MAC address of the first STA.

14. The multi-channel contention method of claim 11, wherein the first control frame is a high efficiency wireless local area network request to send (HEW-RTS) frames, high efficiency wireless local area network clear to send (HEW-CTS) frames, or high efficiency wireless local area network acknowledgement (HEW-ACK) frames.

15. The multi-channel contention method of claim 11, wherein the AR the first STA, the second STA, and the third STA are all part of a basic service set.

16. The multi-channel contention method of claim 11, further comprising:
    subsequently receiving a second control frame from the AP via the first channel and the second channel, but not the third channel after sending the first control frame; and
    exchanging data with the AP using the first channel and the second channel, but not the third channel.

17. The multi-channel contention method of claim 16, wherein the second control frame comprises a frame control field, a duration field, and a receiver address, wherein the frame control field identifies the second control frame, wherein the duration field records a duration of occupying a subsequent channel, and wherein the receiver address is set to a parameter or a numerical value agreed to in advance by the first STA, the second STA, and the third STA.

18. The multi-channel contention method of claim 16, wherein the second control frame is a high efficiency wireless local area network request to send (HEW-RTS) frames, high efficiency wireless local area network clear to send (HEW-CTS) frames, or high efficiency wireless local area network acknowledgement (HEW-ACK) frames.

19. The multi-channel contention method of claim 11, further comprising:
    sending a third control frame to the AP via the first channel succeeding in contention and the second channel and the third channel that are considered to succeed in contention, wherein the third control frame occupies the first channel, the second channel and the third channel; and
    exchanging a data frame with the AP via the first channel.

20. The multi-channel contention method of claim 11, further comprising:
    sending a third control frame to the AP via the first channel succeeding in contention and the second channel and the third channel that are considered to succeed in contention, wherein the third control frame occupies the first channel, the second channel and the third channel; and
    exchanging a data frame with the AP via the channels that receive the third control frame.

* * * * *

UNITED STATES PATENT AND TRADEMARK OFFICE
CERTIFICATE OF CORRECTION

PATENT NO. : 11,025,476 B2
APPLICATION NO. : 15/350334
DATED : June 1, 2021
INVENTOR(S) : Chixiang Ma, Jun Luo and Yalin Liu Page 1 of 1

It is certified that error appears in the above-identified patent and that said Letters Patent is hereby corrected as shown below:

In the Claims

Claim 11, Column 18, Line 47: "tooccupy the" should read "to occupy the"

Claim 14, Column 19, Line 8: "(IIEW-" should read "(HEW-"

Claim 15, Column 19, Line 12: "the AR the first STA," should read "the AP, the first STA,"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*